United States Patent [19]

Fukui et al.

[11] Patent Number: 5,189,441
[45] Date of Patent: Feb. 23, 1993

[54] IMAGE FORMING APPARATUS HAVING DENSITY CONTROL

[75] Inventors: Kazuyuki Fukui, Toyohashi; Takanobu Yamada, Toyokawa, both of Japan

[73] Assignee: Minolta Camera Kabushiki Kaisha, Osaka, Japan

[21] Appl. No.: 694,081

[22] Filed: May 1, 1991

[30] Foreign Application Priority Data

May 2, 1990 [JP] Japan .................. 2-115976

[51] Int. Cl.$^5$ ............................................ G01D 15/14
[52] U.S. Cl. .................................... 346/160; 346/1.1;
346/160; 358/298; 358/300
[58] Field of Search ............... 358/298, 300, 296, 302,
358/457; 346/108, 160, 107 R

[56] References Cited

U.S. PATENT DOCUMENTS

| | | | |
|---|---|---|---|
| 3,631,509 | 12/1971 | Marshall | 346/168 X |
| 4,390,882 | 6/1983 | Ohara et al. | 346/108 X |
| 4,449,153 | 5/1984 | Tschang | 358/296 |
| 4,679,057 | 7/1987 | Hamada | 346/76 |
| 4,912,568 | 3/1990 | Shimano | 359/298 X |
| 4,914,459 | 4/1990 | Mama et al. | 346/160 |
| 5,017,944 | 5/1991 | Kitamura et al. | 346/108 |
| 5,055,855 | 10/1991 | Nishio | 358/298 X |

FOREIGN PATENT DOCUMENTS 55-15169  2/1980  Japan .

Primary Examiner—A. T. Grimley
Assistant Examiner—T. A. Dang
Attorney, Agent, or Firm—Burns, Doane, Swecker & Mathis

[57] ABSTRACT

In an electrophotographic image forming apparatus wherein raster scan of a laser beam is carried out to expose the sensitized photoconductor and the gradation is expressed with intensity modulation method, the duration of the light-emitting time for forming a dot is made smaller than the whole period needed for scanning a region assigned for a dot, while the maximum light intensity is changed according to a ratio of the duration of the light-emitting time to the whole period. Further, a plurality of modes each having a duty ratio different from each other may be provided and the maximum light intensity is changed according to the duty ratio so that the mean quantity of light for a dot is equal to each other.

28 Claims, 8 Drawing Sheets light emitting level light emitting level

IMAGE FORMING APPARATUS HAVING DENSITY CONTROL

BACKGROUND OF THE INVENTION

1. Field of the Invention

The present invention relates to a digital image forming apparatus such as a digital printer or a digital copying machine which is capable of precisely expressing gradation by using light intensity modulation method.

2. Related Art

In an apparatus of forming an image by modulating light intensity, an exposure process is performed against a photoconductor at a light intensity corresponding to a read-out image density signal.

On forming a half-tone image, the influence on the gradation characteristic must be taken into account.

As a whole, the density of image read from a document is not proportional to the density of an image generated on the surface of the photoconductor depending on the photosensitive characteristic of photoconductor, the physical characteristic of the toners and the environmental conditions including temperature and humidity. This results in the generation of non-linear characteristic which deviates from the ideal proportional characteristic to be realized. Conventionally, this nonlinear characteristic is called "gamma characteristic" or "gradation characteristic", which substantially makes up a main cause of deterioration of the fidelity of a reproduced image obtained especially from a document containing a half-tone image.

Then, a digital image forming apparatus preliminarily corrects the output characteristic against the input data of an image of the density of the document, and irradiates a light beam against the photoconductor by applying a light intensity corresponding to the corrected image density data so that the proportional characteristic can eventually be realized. This is called the gradation correction. In other words, at low gradation levels, the digital image forming apparatus outputs a power of light-emitting surpassing the read-out image density data, while at high gradation levels, a less amount of power of light-emitting in order to adjust the density of a reproduced image to be proportional to the gradation level.

Nevertheless, the light intensity modulation method available today generates quite noticeable nonlinear gradation characteristic. The non-linear gradation characteristic is generated by the photosensitivity of photoconductor, physical properties of toners, the light-emitting condition and the like. The light intensity of laser beam available for performing the exposure process has a Gaussian distribution characteristic, and a laser beam has for example 45 micrometer (in the main scan direction) × 75 through 84 micrometer (in the subscan direction) of half width. On the other hand, a dot has a size of for example 63.5 micrometer (in the main scan direction, 400DPI) × 84.7 micrometer (in the sub-scan direction, 300DPI). When performing a scanning operation against the surface of the photoconductor, the laser continuously emits a beam onto the photoconductor during a period corresponding to the length of a dot. As a result, each dot is formed by applying a light intensity corresponding to the magnitude of the read-out image density signal. Nevertheless, the electric potential of an electrostatic latent image formed on the surface of the photoconductor is not uniformly distributed. Furthermore, as a result of the development processing, toner images of adjoining dots superimpose themselves.

In consequence, the greater the non-linearity of the gradation characteristic, the greater the amount of correction needed for properly adjusting the gradation of the read-out image density signal. When the gradation characteristic is affected by the scattering of characteristics or deterioration due to aging of components of the digital image forming apparatus, then, the precision of the gradation correction becomes worse and the gradation characteristic becomes unstable, thus significantly degrading the fidelity of a reproduced image. Accordingly, it is desired that the non-linearity of the gradation characteristic be minimized as small as possible.

SUMMARY OF THE INVENTION

An object of the present invention is to provide a digital image forming apparatus with use of light intensity modulation method which requires not so large gradation correction.

In an electrophotographic image forming apparatus according to this invention wherein raster scan of a laser beam is carried out to expose the sensitized photoconductor and the gradation is expressed with intensity modulation method, the duration of the light-emitting time for forming a dot is made smaller than the whole period needed for scanning a region assigned for a dot, while the maximum light intensity is changed according to a ratio of the duration of the light-emitting time to the whole period. Further, a plurality of modes each having a duty ratio different from each other may be provided and the maximum light intensity is changed according to the duty ratio so that the mean quantity of light for a dot is equal to each other.

It is an advantage of the present invention that the exposure against the photoconductor is performed by using less than 100% of duty ratio of light-emitting time per dot wherein duty ratio is defined as a ratio of the duration of the light-emitting time for forming a dot to the whole period needed for scanning a region assigned for a dot. Since a thinner toner film is formed between dots in the course of fixing toners on a printing paper in the development process, the saturation of image density is retarded at high levels of the amount of light. As a result, the non-linearity of gradation characteristic can securely be decreased.

It is another advantage of the invention that a plurality of modes are provided each having X% of duty ratio of light-emitting time being different from each other, and controlling the maximum intensity P of light beam so that the maximum intensity corresponds to $P_O \times (100/X)$ wherein $P_O$ is the maximum intensity when the duty ratio X is 100%. In consequence, the mean quantity of light on the surface of the photoconductor becomes equivalent independent of the mode at the maximum image signal. In other words, as a whole, the image density is held constant. Furthermore, if the duty ratio becomes smaller, the quantity of light is increased, and at low levels of light-emitting, the gradation characteristic becomes linear.

BRIEF DESCRIPTION OF THE DRAWINGS

An embodiment of the invention will now be described with reference to the accompanying drawings, in which.

DESCRIPTION OF THE PREFERRED EMBODIMENTS

Figure 1:
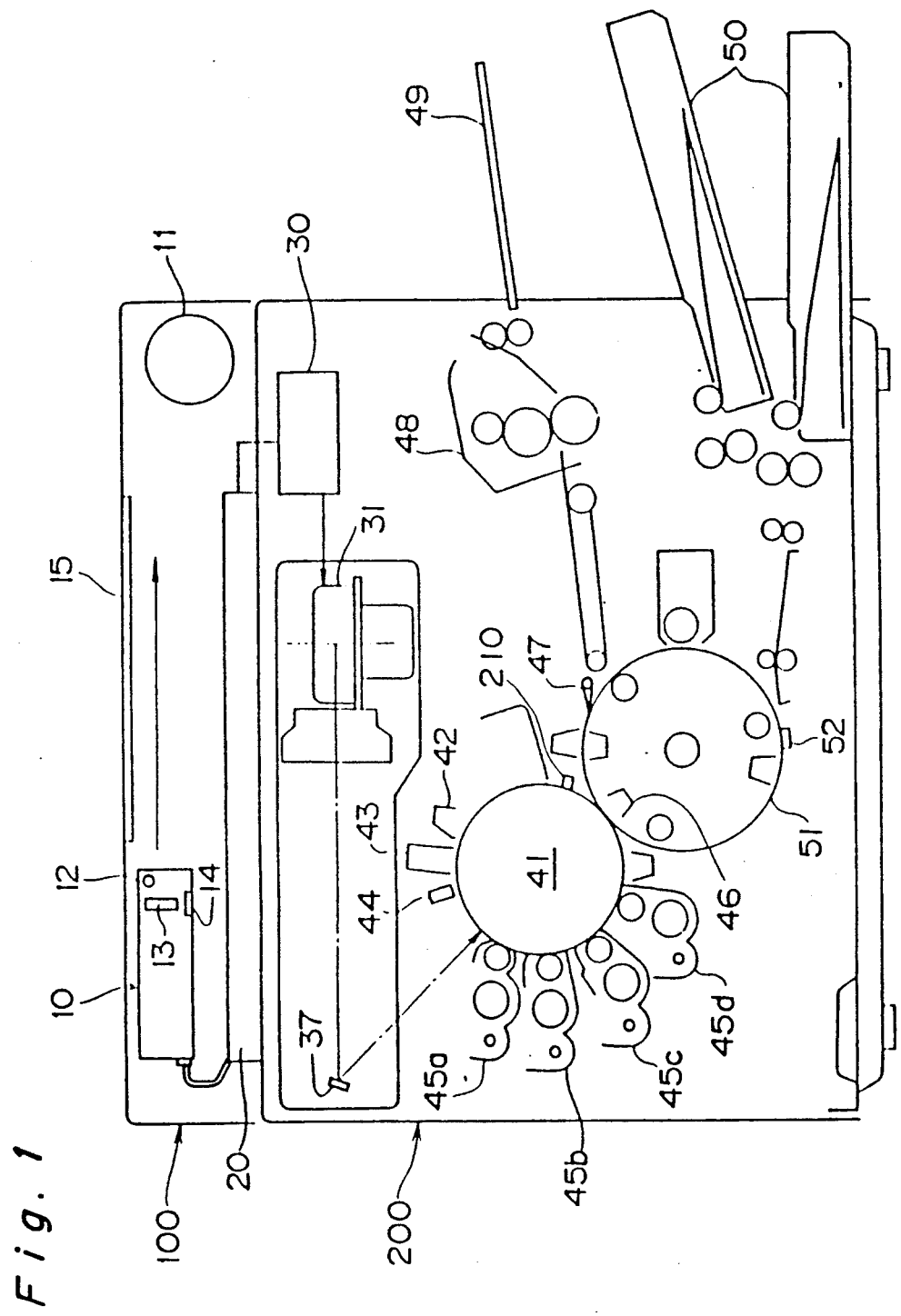
FIG. 1 is an overall schematic block diagram of a digital color image copying machine according to an embodiment of the invention.

Referring now to the drawings, wherein like reference characters designate like or corresponding parts throughout the drawings, the structure of digital copying machine will be explained first, FIG. 1 shows the entire structure of a digital color copying machine according to an embodiment of the present invention. The copying machine consists mainly of an image reader part 100 for reading an image and a print part 100 with use of electrophotographic process.

In the image reader part 100, a scanner 10 has an exposure lamp 12 for illumination a document, a rod lens array 13 for concentration the reflecting light from the document, and a color image sensor 14 of a contact type charge-coupled device (CCD) for transducing the concentrated light to an electric signal. The scanner 10 is driven by a motor 11, when a document is read, to move in a direction (subscan direction) shown by an arrow so as to scan the document placed on a platen 15. The image of the document illuminated by the exposure lamp 12 is transduced into an electric signal by the image sensor 14. Multi-level electric signals of three colors of red (R), green (G) and blue (B) obtained by the image sensor 14 are converted into 8-bit gradation data of four colors of yellow (Y), magenta (M), cyan (C) and black (B) and the gradation data are stored in a buffer memory 30 for synchronization.

Figure 4:
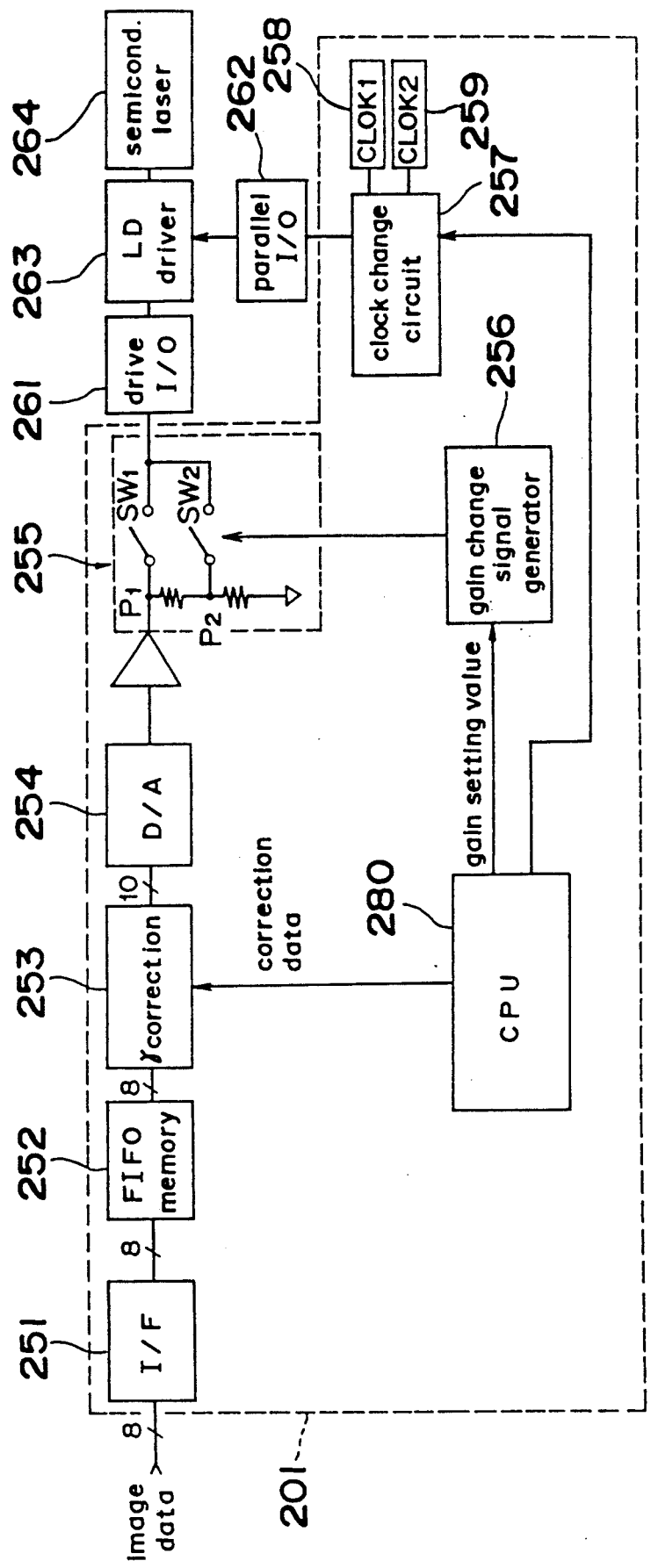
FIG. 4 is a block diagram of the image data processing unit of the printer controller.

Next, in the print part 200, a print head unit 31 performs the gradation correction (that is, gamma correction) of the received gradation data according to the gradation characteristics in the electrophotographic process for forming an image, converts the corrected gradation data into analog data, and generates a driving signal of a laser diode so as to make the laser diode emit a beam (refer FIG. 4).

The laser beam emitted from the print head unit 31 according to the gradation data exposes a photoconductor drum 41 via a reflecting mirror 37. In each copy action, the photoconductor drum 41 having a photoconductor layer, driven to be rotated, is illuminated by an eraser lamp 42, and the photoconductor layer is sensitized by a sensitizing charger 43 uniformly. When the exposure of the photoconductor drum 41 is performed in this state, an electrostatic latent image of a document is formed on the photoconductor drum 41. Then, one of toner development units 45a–45d of cyan, magenta, yellow and black is selected and develops the electrostatic latent image on the photoconductor drum 41 to form a toner image, which is transferred by a transfer charger 46 to a paper wound on a transfer drum 51. On the other hand, a standard toner image is formed in a predetermined area on the photoconductor drum 41 which is exposed at a predetermined light intensity and is developed. The amount of the adhered toners of the standard toner image is detected optically by an AIDC sensor 210. That is, the toner image is illuminated obliquely, and the reflecting light from the toner image is detected. The amount of the adhered toners can be obtained from the quantity of the reflecting light.

The above-mentioned print process is iterated as to the four colors of yellow (Y), magenta (M), cyan (C) and black (B). The scanner repeats in each process the scan action in synchronization with the action of the photoconductor drum 41 and the transfer drum 51. Then, the paper is separated from the transfer drum 51 by operating a separation claw 47, is fixed by a fixing unit 48, and is discharged in a tray 49. A paper is fed by a paper cassette 50, is chucked at its front tip on the transfer drum 51 by a chucking mechanism 52 so as not to cause a discrepancy of the position of a paper when the transfer is performed.

Figure 2:
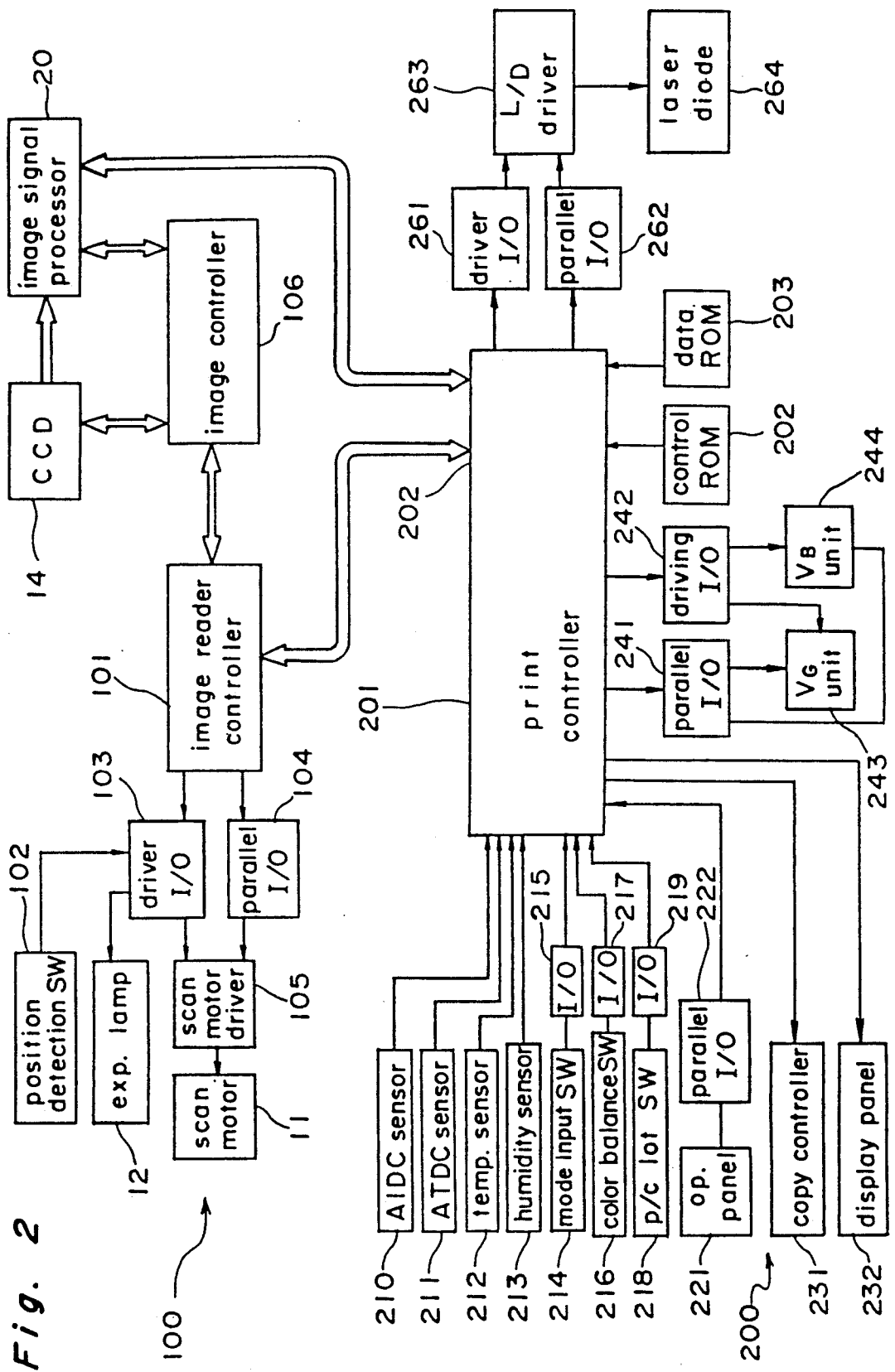
FIG. 2 is an overall schematic block diagram of the control of the digital color image copying machine.

FIG. 2 shows a whole block diagram of a control system of the digital color copying machine of the embodiment of the present invention.

The image reader part 100 is controlled by an image reader controller 101, which controls the exposure lamp 12 via a driver input/output (I/O) device 103 according to the position signal from a position detection switch 102 which shows the position of a document on the platen 15. The image reader controller 101 also controls a scan motor driver 105 via the driver I/O device 103 and a parallel I/O device 104. The scan motor 11 is driven by the scan motor driver 105.

On the other hand, the image reader controller 101 is connected to an image controller 106 via a bus. The image controller 106 is connected via buses to the CCD color image sensor 14 and an image signal processor 20. An image signal from the image sensor 14 is supplied to the image signal processor 20 for the processing to be explained later.

The print part 200 has a print controller 201 for controlling print action. The print controller 201 having a CPU is connected to a control read-only-memory (ROM) 201 storing a program for control and to a data ROM 203 for storing various kinds of data such as gamma correction data. The print controller 201 controls the print action according to the data stored in the data ROM 203.

The print controller 201 receives analog signals from various sensors: the AIDC sensor 210 for detecting optically the amount of the adhered toners of a standard toner image formed on the photoconductor drum 41, an ATDC sensor 211 for detecting the toner density in the development units 45a–45d, a temperature sensor 212 and a humidity sensor 213. Further, the print controller 201 is connected to a mode input switch (2 bits) 214 for setting the mode on a duty ratio and light intensity, color balance switches 216 for setting the color balance level of each color and a photoconductor lot switch 218 for representing the lot dependence of the photoconductor characteristics via I/0 devices 215, 217 and 219, respectively. Various data can be inputted to the print controller 201 via the parallel I/0 device 222 by a key-input of the operational panel 221.

The print controller 201 controls a copy controller 231 and a display panel 232 according to the data obtained from the sensors 210–213, the operational panel 221, input switches 214, 216, 218 and the data ROM 203, while controls a high voltage ($V_G$) unit 243 for generating the grid electric potential $V_G$ of the sensitization charger 43 and a high voltage ($V_B$) unit 244 for generating the development bias voltage $V_B$ of the development units 45a–45d via a parallel I/0 device 241 and a driver I/0 unit 242.

Further, the print controller 201 is connected via an image data bus to the image signal processor 20 of the image reader part 100, while it controls a laser diode (I/0) driver 263 via a driver I/0 device 261 and a parallel I/0 device 262 by referring the contents of the data ROM 203 storing the data for gamma correction. A laser diode (semiconductor laser) 264 is driven by the driver 263 for emitting a laser beam. The expression of gradation can be performed by the modulation of the intensity of a laser beam emitted by the laser diode 263 under a constant pulse width. (In some embodiments, the gradation is expressed by using pulse width modulation method under a constant intensity of light (refer section (d-6).)

(b) Processing of image signal

Figure 3:
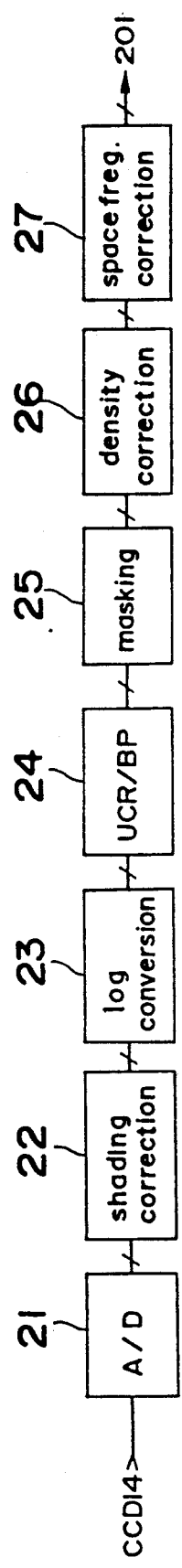
FIG. 3 is a block diagram of the image signal processing unit of the digital color image copying machine.

FIG. 3 shows a flow of the processing of image signal from the CCD color image sensor 14 via the image signal processor 20 to the print controller 201. By referring FIG. 3, the processing of an output signal from the CCD color image sensor 14 is explained.

In the image signal processor 20, an image signal obtained by the CCD color image sensor 14 by using the photoelectric properties is converted to a multi-level digital image data of R, G, B by an analog-to-digital converter 21. The image data converted is corrected for shading by a shading correction circuit 22. The image data corrected is converted to a density data of an actual image by using a logarithm conversion with a log conversion circuit 23. Further, the density data is processed by a UCR/BP (undercolor remove/black paint) circuit 24 to remove unnecessary black coloring and to generate a true black data K from the R, G, B data, and then the data R, G, B of the three colors, red green and black, are transformed into data Y, M, C of the three colors of yellow, magenta and cyan by the masking circuit 25. A density correction circuit 26 processes density correction by multiplying predetermined coefficients to the Y, M, C data transformed as described above, and then a space frequency correction circuit 27 performs the space frequency correction on the data processed by the density correction circuit 26. Finally, the data of each color are supplied to the print controller 201 as a multi-level density data of level 0–255.

FIG. 4 is block diagram of an image processing of the print controller 201. An eight-bit image data received from the image data processing circuit 20 is transferred to a first-in and first-out (hereinafter referred to as FIFO) memory 252. via an interface 251. The FIFO memory 252 is substantially a line buffer memory which is capable of storing gradation data of an image covering the predetermined number of lines in the main scan direction, and the FIFO memory 252 can compensate the difference of clock frequencies of the image reading unit 100 and of the print unit 200. The FIFO memory 252 delivers the gradation data to a gamma correction unit 253. As will be described below, the CPU 280 sends the gamma correction data stored in the data ROM 203 to the gamma correction unit 253. The gamma correction unit 253 then corrects the input data so as to send the light-emitting level to a D/A (digital-to-analog) converter 254 which converts the light-emitting level (digital data) to an analog electric voltage. In the meantime, in response to a gain set value sent from the CPU 280, a gain switching signal generating circuit 256 sets the gain by changing switches SW1 and SW2 which independently deal with a power Pl and P2 being different from each other. A gain switching unit 255 then amplifies the voltage with the gain set by the gain switching signal generating circuit 256, and then sends the amplified value to a semiconductor laser driver 263 via a drive I/0 port 261 so that a semiconductor laser unit 264 can emit a light beam of the light intensity in correspondence with the amplified value.

On the other hand, the CPU 280 outputs a control signal to a clock switching circuit 257 so that it can select either of clock generating circuits 258 and 259 for generating clock signals which is compatible with the duty ratio (to be defined later) of light-emitting time specified by the mode input switch 214, and then a light-emitting signal according to clock signals generated by the selected clock generating circuit 258 or 259 are sent to the semiconductor laser driver 263 via a parallel I/0 port 262. The semiconductor laser driver 263 generates an electric current needed for driving the semiconductor laser 264 for light-emitting only when the light emitting signal is received from the print controller 201.

Next, the adjustment of the duty ratio of light-emitting time, the control of maximum light intensity, and the correction of the gradation are described below. When a half-tone image is reproduced with electrophotographic process, gradation characteristic must be taken into account. Generally, when the gradation is controlled by using a light intensity modulation method, the gradation is affected by a variety of factors including photosensitivity of the photoconductor, physical properties of the toners and environmental conditions including temperature and humidity. Therefore, the density of an image (hereinafter called as the input level) is read from a document to be reproduced is not proportional to the light intensity level of the laser beam or to the actually reproduced image density level. As a result, a characteristic of a reproduced image is deviated from the ideal proportional characteristic. Such a characteristic is called generally "gamma characteristic" or "gradation characteristic", which substantially is a main cause of the degradation of the fidelity of a reproduced image of a document containing a half-tone image.

In a digital image forming apparatus of this embodiment, the proportional characteristic is realized by controlling the output characteristic of the output power P, which is also called the laser energy, of the semiconductor laser 264 with the gamma correction circuit 253.

In the digital image forming apparatus, a plurality of gamma correction tables each representing gradation correction data in correspondence with respective modes is stored in the data ROM 203 preliminarily. On the other hand, the gamma correction unit 253 selects a proper gamma correction table according to the selected mode in order to perform the gamma correction by referring to the selected gradation correction data (refer to FIG. 14).

The gradation characteristic of the light intensity modulation method is very non-linear in contrast to that of the pulse modulation method. Therefore in this method the degree of gradation correction is large. Because of this remarkable non-linearity, the gradation characteristic is liable to vary with the environmental conditions. In order to solve this problem, as will be described below, two modes are provided each using a prescribed duty ratio of laser light-emitting time and a prescribed light intensity, and an operator can set either of these modes by operating the mode input switch 214. The duty ratio is defined as a ratio of the duration of the light-emitting time for forming a dot in raster scan to the whole period needed for scanning a region assigned for a dot. The second mode provides 100% of duty ratio, while the first mode provides X% (X<100) of duty ratio, and the maximum light intensity P in the first mode is determined so as to satisfy an equation $P = P_O \times (100/X)$ wherein $P_O$ designates the maximum light intensity in the second mode. The first mode provides the maximum light-emitting intensity larger than the second mode does, so that the first mode provides the mean quantity of light for a dot equivalent to that of the second mode. That is, the total amount of laser energy against the photoconductor drum in the first mode can be kept the same as that in the second mode without lowering the density at all.

Figure 5:
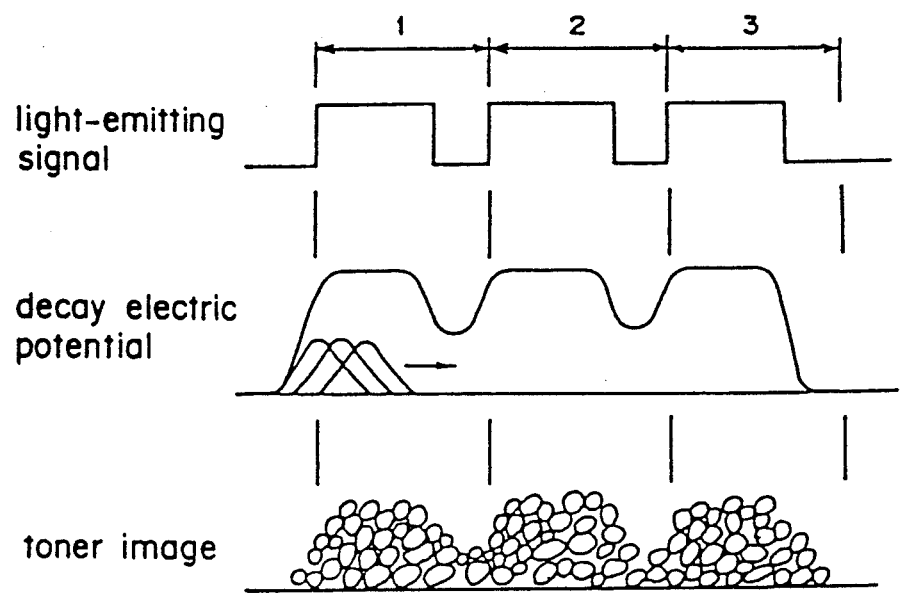
FIG. 5 is a diagram illustrating continuous three-dot light-emitting signals, decay potential, and deposited toners in the first mode.
Figure 6:
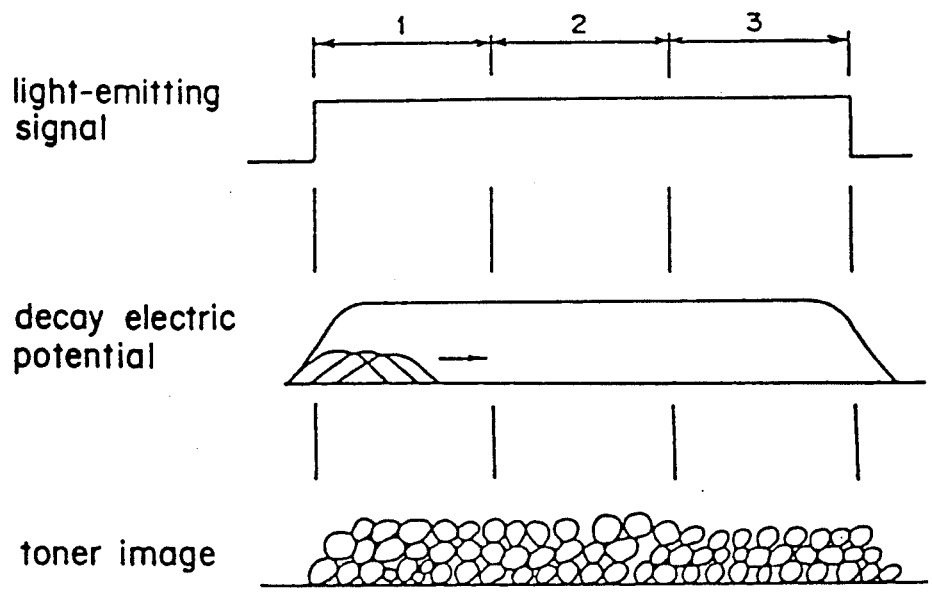
FIG. 6 is a diagram illustrating continuous three-dot light-emitting signals, decay potential, and deposited toners in the second mode.

Next, the gradation characteristics of the first and second modes are described below. The patterns shown in the middle of FIGS. 5 and 6 designate the decay of electric potential on the surface of the photoconductor when three dots designated by numerals 1, 2 and 3 are irradiated successively on the photoconductor with laser beam according to the identical light-emitting level in the main scan direction in the first and second modes as shown in the top of FIGS. 5 and 6, respectively. A continuation of low bumps in the patterns designates timewise variation of the laser-beam intensity distribution caused by scanning in the main direction. In the first mode shown in FIG. 5 having a duty ratio smaller than 100%, the light intensity distribution varies itself in a period corresponding to a dot, while in the second mode shown in FIG. 6, the light intensity distribution remains unchanged in three dots with use of the laser beam. Therefore, in the first mode, the potential decay on the surface of the photoconductor changes in a period per dot, whereas in the second mode the light intensity distribution remains constant between dots. Thus, as shown in the patterns shown at the bottom of FIGS. 5 and 6, in the first mode, there is a peak per dot when the toners are developed on the surface of the photoconductor and fixed on a sheet of paper, whereas in the second mode, as a whole, a certain amount of toners equivalent to those adhered in the second mode adheres to the photoconductor as well. Nevertheless, the toners thinly adheres to some regions between dots in the first mode. As a result, in the first mode, the saturation of toner density delays up at a higher light-emitting level.

Figure 7:
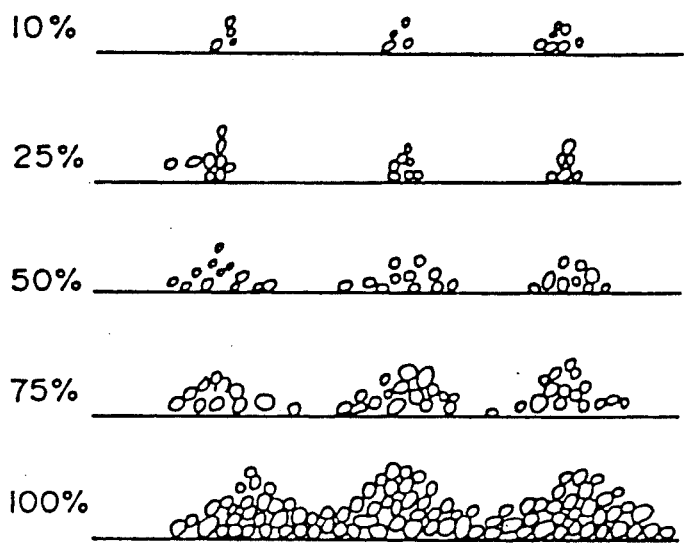
FIG. 7 is a diagram illustrating the state of the deposited toners when a variety of light-emitting levels are applied in the first mode.
Figure 8:
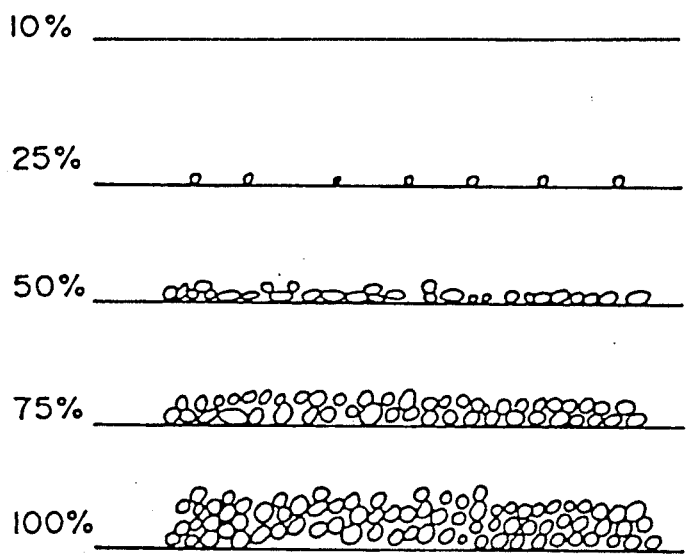
FIG. 8 is a diagram illustrating the state of the deposited toners when a variety of light-emitting levels are applied in the second mode.

FIGS. 7 and 8 schematically illustrate the state of the adhesion of toners onto the surface of the photoconductor in the first and in the second modes, respectively, at light-emitting level of 10%, 25%, 75%, and 100% of the maximum light-emitting intensity.

In contrast to the first mode in which toners adheres to the surface of the photoconductor even at 10% of the light-emitting level, actually, toners adhere little to the surface of the photoconductor in the second mode, because the light-emitting intensity in the first mode is larger than that in the second mode.

Figure 9:
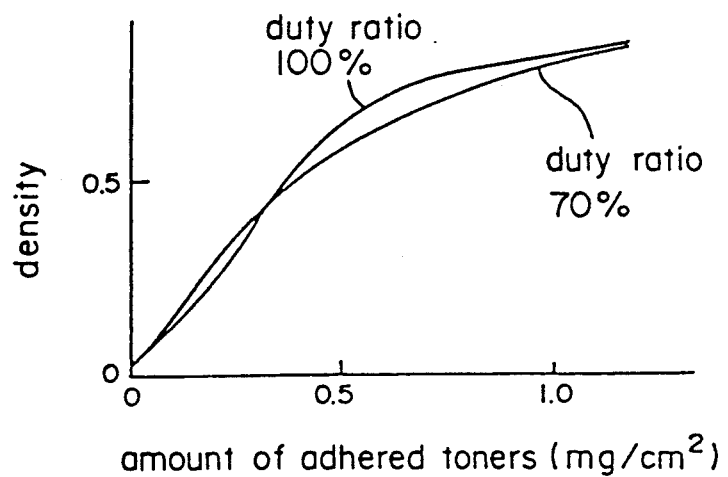
FIG. 9 is a graph showing the variation of the image density plotted against the amount of magenta toners adhered to the photoconductor.

FIG. 9 shows the density characteristic when the adhered amount of magenta toners per unit area is varied when compared to the case of 100% of duty ratio, the linearity of the density characteristic is improved in the case of 70% of the duty ratio. The curves do not pass through the origin owing to fog or the like.

Figure 10:
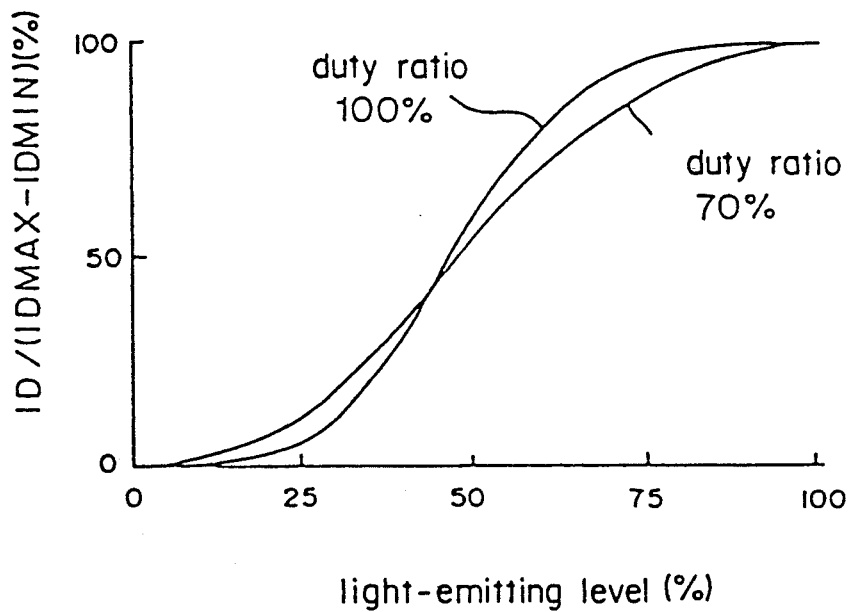
FIG. 10 graph showing the gradation characteristic plotted against the light-emitting level.

FIG. 10 shows the variation of the gradation characteristic or of the density (ID) against the input level between the first and second modes (100% and 70% of the duty ratio), wherein the density (ID) is normalized between the maximum and the minimum. Though in the first and second modes, identical mean light intensity is emitted onto the surface of the photoreceptive drum, sharp reduction of the non-linearity of the density characteristic against the incident light-emitting level is to be noted in the first mode.

Figure 11:
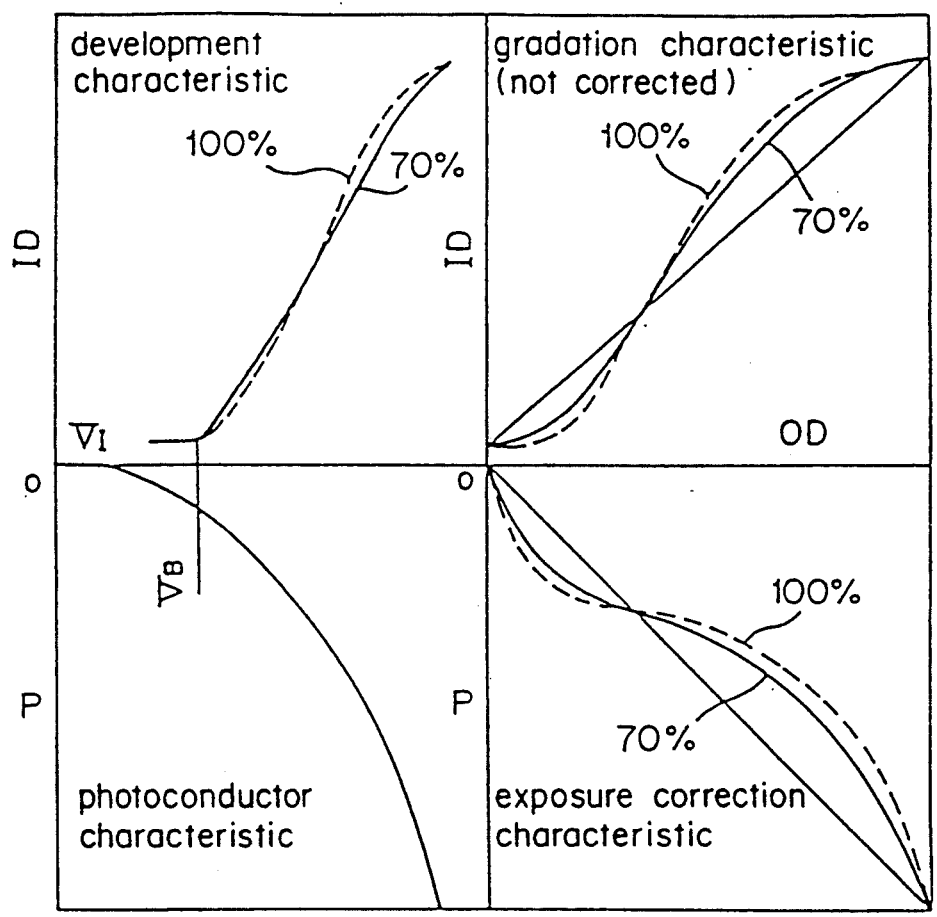
FIG. 11 is a graph of four characteristics.

FIG. 11 graphically shows a variety of characteristics in the first and second modes. The gradation characteristic shown in the upper right part designates a pattern similar to that shown in FIG. 9 against the input level OD. As shown in the lower right pattern designating the exposure correction characteristic, the gamma correction unit 253 corrects the output level or the light-emitting level. The lower left pattern designates the decay potential $V_I$ of the photoconductor on exposure at the output power P of the semiconductor laser in correspondence with the light-emitting level. The upper left pattern designates the development characteristic against the decay potential $V_I$. Since the gradation characteristic in the first mode of 70% of duty ratio, is much better than that in the second mode of 100% of duty ratio, the first mode requires a less amount of exposure correction. Likewise, the non-linearity of the development characteristic is improved more in the first mode.

It is shown clearly FIGS. 10 and 11 that the non-linearity of the gradation characteristic in the first mode of 70% duty ratio is significantly improved. Although the first mode uses 70% duty ratio, the light-intensity output is increased, so that a quite satisfactory image can be reproduced even at low density levels, while at high density levels, the saturation of density caused by superposition of dots is retarded. Therefore, the first mode provides satisfactory linearity for the gradation characteristic throughout the entire range. Since in the first mode the duty ratio is less than 100%, a reproduced image contains vertical lines in each dot. This in turn provides sufficient resistance against noise components in the sub-scan direction.

On the other hand, as shown in FIG. 8, since toners adhere uniformly onto the surface of the photoconductor in the second mode, it is a characteristic that a reproduced image is smooth.

An operator can reproduce a desired image by initially activating a mode input switch 214 in order to select either of the first and second modes by taking the desired image quality into account.

In the first mode, the nonlinearity in the gradation characteristic is small, but still obvious. Therefore, it is better to perform gradation correction in order to reproduce an image with fidelity. The data ROM 203 stores a gradation correction data (the first gamma correction table) for the first mode and another gradation correction data (the second gamma correction table) for the second mode, and by using a gamma correction table corresponding to the entered mode, the gamma correction unit 253 corrects the input image density data 0 through 255 to send the corrected data.

On the other hand, the CPU 280 instructs the gain switching unit 255 to set a gain corresponding to the entered mode via the gain switching signal generating circuit 256. Thus, the value of the maximum light intensity is changed in correspondence with the entered mode. At the same time, the CPU 280 delivers a signal to the clock switching circuit 257, which then selects either of the clock generating circuits 258 and 259 corresponding to the entered mode in order that the duty ratio can properly be switched over to the predetermined value.

A flow of the control of print action by the print controller 201 will be explained below.

Figure 12:
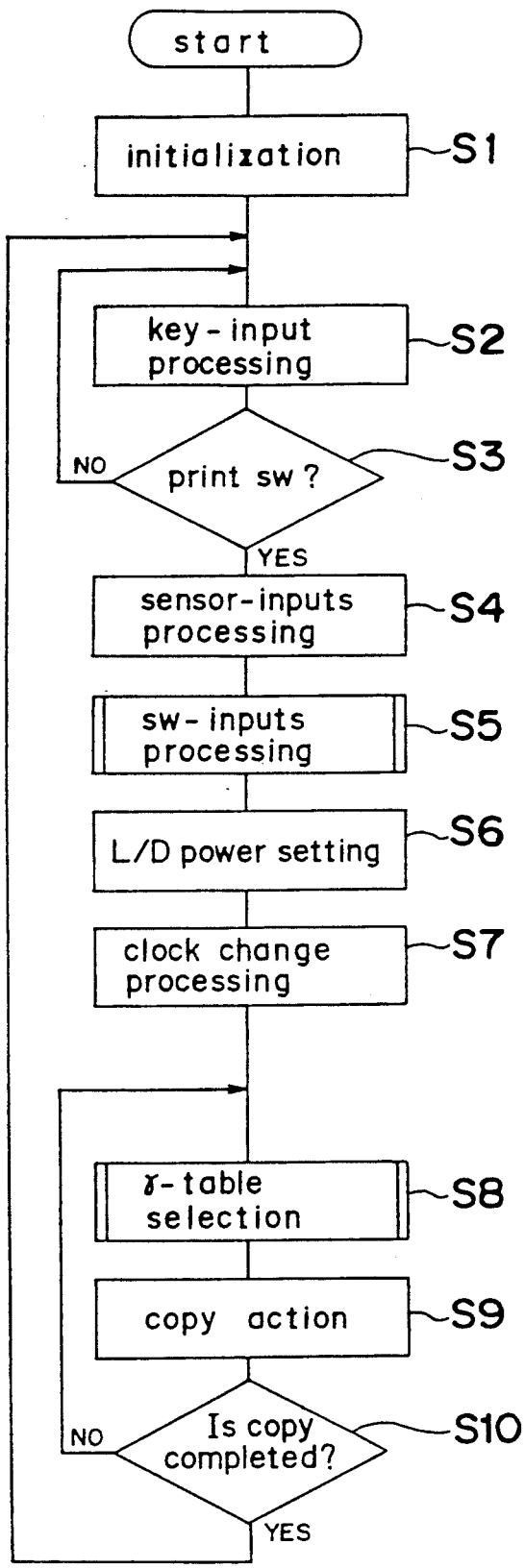
FIG. 12 is a main flowchart of the print controller of the digital color image forming apparatus.
Figure 13:
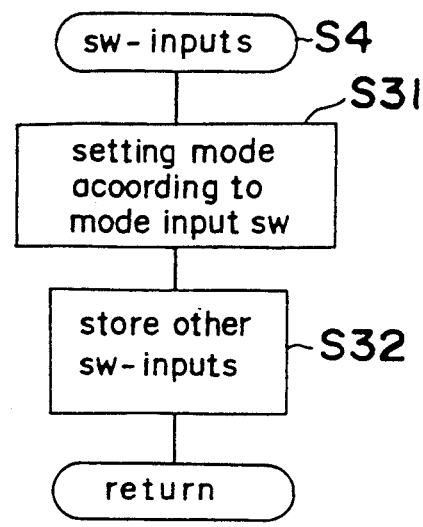
FIG. 13 is a flowchart of switch-inputs processing.

FIG. 12 shows a flowchart describing sequential steps of the control by the print controller 201. First, the CPU 280 of the print controller 201 is initialized at step S1. Next, a key-input of the print switch on the operational panel 221 is waited (steps S2 and S3). If the print switch is touched (YES at step S3), data from respective sensors 210-213 are inputted at step S4. Next, switch inputs are processed at step S5. Concretely, as shown in FIG. 13, the CPU 280 receives either the first mode signal or the second mode signal from the mode input switch 214, and then stores the received mode data at step S31. The CPU 280 further stores data received from the other switches in the following step S32, and then the flow returns to the main routine. Next, as shown in FIG. 12, the power of the semiconductor laser is set at step S6. Concretely, in response to the mode selected at step S5, the CPU 280 outputs a gain value to the gain change signal generator 256. Next, at step S7 the print controller 201 changes clock pulses. In other words, the CPU 280 outputs a clock switching signal to the clock change circuit 257 in order to select either of the clock generators 258 and 259. After completing the above routine, a gamma correction table needed for selecting proper gradation data is selected in correspondence with the mode selected at step S8. Next, an electrophotographic copying is operated at step S9. Next, it is decided if the copy action is completed or not at step S10. If the copy action is decided to be already completed, then the flow returns to step S2.

Figure 14:
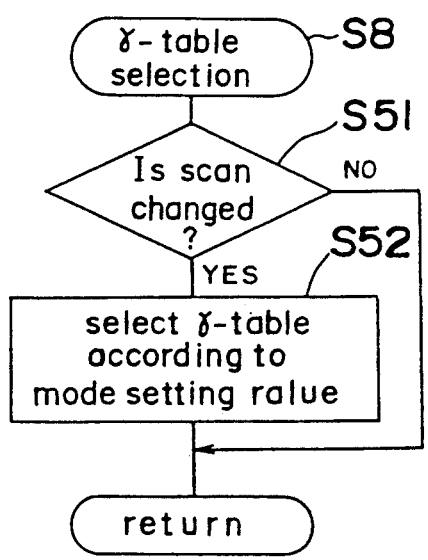
FIG. 14 is a flowchart of ganxaa correction table selection.

FIG. 14 presents an flowchart of the process executed at step S8 in order to select a proper gamma correction table. First, at step S51, it is decided if the scan mode is changed or not. If the scan mode is decided to be changed, then a proper gamma correction table is selected according to the mode entered at step S52, and the flow returns to the main routine. The selected proper gamma correction table is then read out while executing a copy action at step S9, for converting the input level OD into an output level.

Since the digital image forming apparatus of this embodiment decreases the duty ratio of the laser-beam light-emitting time to be less than 100%, the non linearity of the gradation characteristic has surely been reduced to permit the apparatus to stably correct the gradation characteristic.

The digital image forming apparatus of this embodiment permits an operator to manually select the needed mode by operating the mode input switch 214. Alternatively, it is also possible for a digital image forming apparatus to detect a variety of factors which affect the quality of image, including environmental conditions like temperature and humidity, the total number of the executed copy actions, deterioration of the photoconductor, and the kinds of documents, and to vary the duty ratio of the laser-beam light-emitting time automatically in response to those factors.

Furthermore, the digital image forming apparatus according to the above-mentioned embodiment has introduced a method for switching the duty ratio into two steps including 70% and 100%. However, in response to those many factors mentioned above, the apparatus can also switch the duty ratio into a variety of steps. If a digital image forming apparatus is capable of freely adjusting the duty ratio to an optimal value steplessly, then the duty ratio can more finely be adjusted, thus making it possible to reproduce an optimal image in perfect compatibility with the environmental conditions.

Furthermore, by virtue of the provision of a plurality of modes capable of providing a variety of duty ratios, the digital image forming apparatus of the invention can stably vary the sense of the quality of a reproduced photographic image.

In the above-mentioned embodiments, the light-emitting of the laser diode is stopped when a light-emitting signal is outputted from the print controller 201. However, a very weak current may be supplied from the semiconductor laser driver 263 to the semiconductor laser 264 in order to emit a weak light so as not to allow toners to the photoconductor even when a light-emitting signal is not supplied.

It is understood that various other modifications will be apparent to and can be readily made by those skilled in the art without departing from the scope and spirit of the present invention. Accordingly, it is not intended that the scope of the claims appended here to be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. An electrophotographic image forming apparatus, comprising:

a photoconductor having a sensitized surface;

exposure means for forming an electrostatic latent image on the sensitized surface of said photoconductor by performing a raster scan with a light beam;

exposure control means for controlling an intensity of the light beam irradiating the sensitized surface of said photoconductor with said exposure means in correspondence with an image density signal designating a density of respective picture elements of an image to be formed, and for controlling said exposure means so that a predetermined interval can be inserted between lighter emitting periods; and interval control means for changing a duration of the interval;

wherein said exposure control means varies the intensity of the light beam in correspondence with the duration of the interval.

2. An electrophotographic image forming apparatus according to claim 1, wherein said exposure control means inhibits said exposure means from emitting the light beam in the interval.

3. An electrophotographic image forming apparatus according to claim 1, wherein the intensity of the light beam in the interval is kept constant independent of the image density signal.

4. An electrophotographic image forming apparatus according to claim 1, wherein said exposure control means controls said exposure means in order that the intensity of the light beam corresponding to said image density signal is increased as the interval becomes larger.

5. An electrophotographic image forming apparatus according to claim 1, wherein said exposure control means comprises an amplifying means for amplifying said image density signal at a gain which is varied in correspondence with the duration of the interval.

6. An electrophotographic image forming apparatus according to claim 5, wherein said exposure control means increases the gain as the duration of the interval becomes longer.

7. An electrophotographic image forming apparatus according to claim 1, further comprising an operating means for allowing an operator to input a data, wherein said interval control means varies the duration of the interval in response to the data inputted with the operating means.

8. An electrophotographic image forming apparatus, comprising:
a photoconductor having a sensitized surface;
exposure means for forming an electrostatic latent image on the sensitized surface of said photoconductor by performing a raster scan with a light beam;
exposure control means for controlling an intensity of the light beam irradiating the sensitized surface of said photoconductor with said exposure means in correspondence with an image density signal designating a density of respective picture elements of an image to be formed, and for controlling said exposure means so that a predetermined interval can be inserted between light emitting periods;
interval control means for changing a duration of said interval;
memory means for storing a plurality of image density correction data; and
selection means for selecting one of said image density correction data according to the duration of the interval;
wherein said light exposure control means controls the intensity of the light beam based on the selected image density correction data.

9. An electrophotographic image forming apparatus comprising:
a photoconductor having a surface;
exposure means for forming an electrostatic latent image on the surface of said photoconductor by performing a raster scan with a light beam;
exposure control means for controlling an intensity of the light beam irradiating the surface of said photoconductor with said exposure means in correspondence with an image density signal designating a density of each picture element of an image to be formed;
selection means for selecting one of a first mode and a second mode; and
interval control means for controlling said exposure means so that a predetermined interval can be inserted between two light-emitting periods based on a light intensity corresponding to each picture element when the first mode is selected, and for controlling said exposure means so that an exposure process at a light intensity corresponding to each picture element is performed without intervals when the second mode is selected.

10. An electrophotographic image forming apparatus according to claim 9, wherein said exposure control means changes the intensity of the light beam according to the mode selected by said selection means.

11. An electrophotographic image forming apparatus according to claim 10, wherein said exposure control means increases the intensity of the light beam when the first mode is selected, more than the intensity when the second mode is selected.

12. An electrophotographic image forming apparatus according to claim 11, wherein a maximum intensity in the first mode is increased more than a maximum intensity in the second mode so that a mean quantity of light for a dot is kept same in the first and the second mode.

13. An electrophotographic image forming apparatus according to claim 9, wherein said exposure control means further comprises an amplifying means for amplifying the image density signal at a predetermined gain, and said exposure control means varies the gain in correspondence with the mode selected by said selection means.

14. An electrophotographic image forming apparatus according to claim 9, further comprising a memory means for storing a plurality of image density correction data and a second selection means for selecting one of said image density correction data in correspondence with the mode selected by said selection means, wherein said exposure control means controls the intensity of the light beam based on the image density correction data selected by said second selection means.

15. An electrophotographic image forming apparatus, comprising:
a photoconductor having a surface;
light-beam generating means for generating a light beam;
scanning means for scanning the light beam on the surface of said photoconductor at a constant speed;
conversion means for converting a digital signal in correspondence to an image density of each picture element of an image to be formed into an analogue signal;
amplifying means for amplifying the analogue signal to output an amplified analogue signal;
exposure control means for generating the light beam based on a light intensity corresponding to the amplified analogue signal in synchronization with a speed of the light beam scanning the surface of said photoconductor, and for controlling the light beam generating means in order that a predetermined period of interval can be inserted between two light emitting periods based on a light intensity corresponding to the amplified analogue signal; and change means for changing a ratio of the interval against a duration of said scanning operation executed for each picture element;

wherein said amplifying means changes a gain for amplifying the analogue signal in correspondence with the ratio changed by said change means.

16. An electrophotographic image forming apparatus according to claim 15, wherein said amplifying means increases the gain of the interval as the duration becomes longer, so that the intensity of light beam corresponding to the image density signal is increased.

17. An electrophotographic image forming apparatus according to claim 15, further comprising:

memory means for storing a plurality of image density correction data, selection means for selecting one of said image density correction data in correspondence with the ratio, correction means for correcting an input digital signal based on the selected image density correction data, and means for providing digital signals corrected by said correction means to the conversion means.

18. An electrophotographic image forming apparatus, comprising:

a photoconductor having a surface;

a charger for sensitizing the surface of said photoconductor at a predetermined electric potential;

exposure means for exposing the sensitized surface of said photoconductor per picture element of an image to be formed while forming a predetermined interval between exposed regions corresponding to picture elements;

exposure control means for controlling an intensity of light emitted with said exposure means in correspondence with image density of each picture element; and operating means for allowing an operator to input data;

wherein said exposure means changes a ratio of the interval against an exposed region on the surface of said photoconductor in response to the input data of said operating means; and said exposure control means changes the intensity of light beam in correspondence with the ratio.

19. An electrophotographic image forming apparatus according to claim 18, wherein said exposure control means controls said exposure means so that the intensity of light for exposure in correspondence to the image density signal can be increased according as the interval increases.

20. An electrophotographic image forming apparatus according to claim 18, further comprising a memory means for storing a plurality of image density correction data and a selection means for selecting one of said image density correction data in correspondence with the ratio, wherein said exposure control means controls the light intensity of exposure based on said image density correction data.

21. An electrophotographic image forming apparatus, comprising:

a photoconductor having a surface;

a charger for sensitizing the surface of said photoconductor at a predetermined electric potential;

exposure means for exposing the sensitized surface of said photoconductor per picture element of an image to be formed while forming a predetermined interval between exposed regions corresponding to picture elements;

exposure control means for controlling an intensity of a light beam emitted with by said exposure means in correspondence with image density of each picture element;

change means for changing a ratio of the interval against an exposed region;

a memory for storing a plurality of image density correction data; and selection means for selecting one of the image density correction data in correspondence with the ratio;

wherein said exposure control means controls the intensity of the light beam for exposure according to the selected image density correction data.

22. An electrophotographic image forming apparatus, comprising:

a photoconductor having a sensitized surface;

exposure means for forming an electrostatic latent image on the sensitized surface of said photoconductor by performing a raster scan with a light beam;

exposure control means for controlling an intensity of light beam irradiating the sensitized surface of said photoconductor with said exposure means in correspondence with an image density signal designating a density of respective picture elements of an image to be formed, and for controlling said exposure means so that the sensitized surface of said photoconductor is irradiated by the light beam corresponding to the image density signal at regular intervals; and interval control means for changing a duration of said interval;

wherein said exposure control means varies the intensity of the light beam in correspondence with the duration of the interval.

23. An electrophotographic image forming apparatus according to claim 22, wherein said exposure control means inhibits said exposure means from emitting the light beam in the interval.

24. An electrophotographic image forming apparatus according to claim 22, wherein the intensity of light beam in the interval is kept constant independent of the image density signal.

25. An electrophotographic image forming apparatus according to claim 22, wherein said exposure control means controls said exposure means in order that the intensity of light beam corresponding to said image density signal is increased as the interval becomes longer.

26. An electrophotographic image forming apparatus according to claim 22, wherein said exposure control means comprises an amplifying means for amplifying said image density signal at a gain which is varied in correspondence with the duration of the interval.

27. An electrophotographic image forming apparatus according to claim 26, wherein said exposure control means increases the gain as the duration of the interval becomes longer.

28. An electrophotographic image forming apparatus according to claim 22, further comprising an operating means for allowing an operator to input a data, wherein said interval control means varies the duration of the interval in response to the data inputted with the operating means.

* * * * *